United States Patent [19]

Will et al.

[11] 4,250,922
[45] Feb. 17, 1981

[54] ELECTROMAGNETICALLY OPERATED CONTROL VALVE

[75] Inventors: Gerhard Will, Steinheim; Walter Stroh, Cleebronn, both of Fed. Rep. of Germany

[73] Assignee: Robert Bosch GmbH, Stuttgart, Fed. Rep. of Germany

[21] Appl. No.: 42,063

[22] Filed: May 24, 1979

[30] Foreign Application Priority Data

May 24, 1978 [DE] Fed. Rep. of Germany ....... 2822597

[51] Int. Cl.³ ........................................... F15B 13/044
[52] U.S. Cl. ................................. 137/625.65; 251/129
[58] Field of Search .................... 137/625.65; 251/129

[56] References Cited

U.S. PATENT DOCUMENTS

| | | | |
|---|---|---|---|
| 3,016,920 | 1/1962 | Thomsen et al. | 137/625.65 |
| 3,791,408 | 2/1974 | Saitou et al. | 251/129 X |
| 3,880,476 | 4/1975 | Belart et al. | 137/625.65 X |

FOREIGN PATENT DOCUMENTS

| | | | |
|---|---|---|---|
| 59123 | 4/1954 | France | 251/129 |
| 1240632 | 4/1960 | France | 137/625.65 |
| 284537 | 1/1971 | U.S.S.R. | 251/129 |
| 571651 | 10/1977 | U.S.S.R. | 137/625.65 |

*Primary Examiner*—Gerald A. Michalsky
*Attorney, Agent, or Firm*—Michael J. Striker

[57] ABSTRACT

The electromagnetically operated sliding spool control valve particularly for use in connection with an automatic transmission system of a motor vehicle, comprises an armature of the electromagnet which is supported at one end of a plunger the other end of which is formed into a sliding spool. The spool is guided in a valve sleeve integrally connected to a fixed core of the electromagnetic coil. A return spring is arranged around a plunger portion between the core and the armature. The valve sleeve is seated in a central boring of a valve channel plate provided with a plurality of annular grooves communicating via transverse borings with the central passage of the sleeve. The sleeve opens into a pressure space which communicates via a flow return channel with a port for the main pressure so that the main pressure acts against the free end of the spool.

7 Claims, 2 Drawing Figures

256# ELECTROMAGNETICALLY OPERATED CONTROL VALVE

BACKGROUND OF THE INVENTION

This invention relates in general to directional control valves and more specifically it relates to a sliding spool control valve controlled by an electromagnet and designed particularly for use in shift control systems of a motor vehicle. Conventional control valves of this type have a separate sliding spool which at one face is coupled to the armature whereas the other face of the spool cooperates with a differential piston. The disadvantage of this known construction is the separation of the electromagnet and of the valve proper into two separate structural units so that the resulting electromagnetically controlled valve is oversized and expensive to manufacture. In addition, conventional sliding spool valves are exposed to the danger of magnetic clamping of the sliding spool when a portion of the magnetic flux affects the sliding spool (German "Gebrauchsmuster" DE-GBM No. 72 02 049).

SUMMARY OF THE INVENTION

It is therefore a general object of the present invention to overcome the aforementioned disadvantages.

More particularly, it is an object of the invention to provide an improved electromagnetically operated sliding spool control valve which is simple in operation and compact in structure, which has a short response time and large cross-section of its ports.

In keeping with these objects and others which will become apparent hereafter, one feature of the invention resides, in an electromagnetically operated sliding spool control valve in a combination which comprises an electromagnet having a fixed magnetizable core defining a central passage, an armature movably arranged opposite face of the magnetizable core, a plunger coaxially attached to the armature and projecting into the passage of the core, a portion of the core forming a valve housing defining at least a load port and fluid return port, and the sliding spool being movable in this valve housing and being integrally connected to the ends of the plunger. Return spring normally holds the armature apart from the core thus keeping the spool in a starting position relative to the valve housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 2:
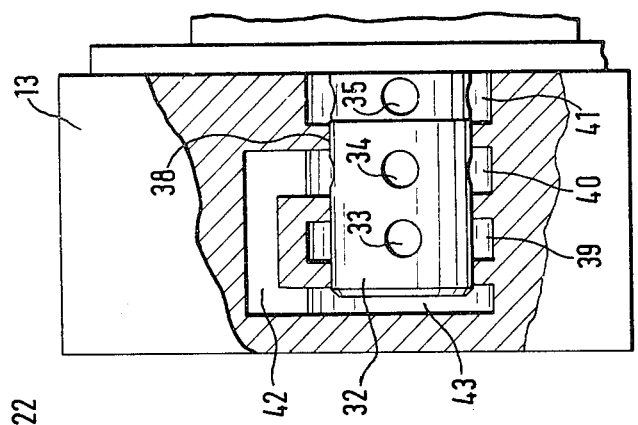
FIG. 2 is another sectional side view of a cut-away portion of the valve of FIG. 1, taken along the line II—II.
Figure 1:
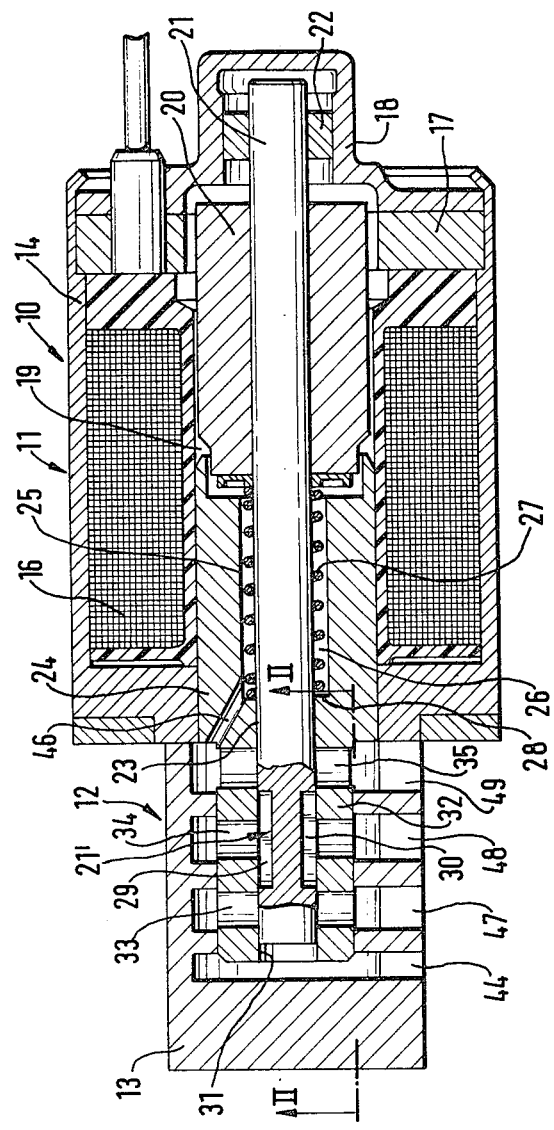
FIG. 1 is a sectional side view of an electromagnetically controlled sliding spool control valve of this invention.

The electromagnetically operated slide spool control valve assembly 10 includes an electromagnet 11 and a valve unit 12. The valve 12 is disposed in a cylinder plate 13 which is attached to housing 14 of the whole valve assembly 10. Housing 14 encloses a tubular electromagnetic coil 16 an end plate 17 of a magnetically conductive material and a cover 18 closing one end of the housing 14.

A movable armature 20 is coaxially supported on a plunger 21 and movable in both axial directions in the cylindrical passage 10 in coil 16. The plunger 21 is supported for the axial movement in bearing 22 disposed in the cover 18 and in another bearing 23 which is formed in the tubular core 24 of a magnetizable material. The central boring 26 of the core 24 exceeds in diameter the clearance of the bearing 23 and the resulting annular interspace 26 serves for accommodating a pressure spring 27 which rests at one end of a shoulder 28 of the bearing 26 and at the other end abuts against the armature 20. Bearing 23 which is a part of the fixed core 24 is extended outwardly to form a valve sleeve 32 and the end portion of plunger 21 which projects into the valve sleeve forms the sliding spool 21' of the valve unit. Two diametrically opposed axial grooves 29 and 30 are formed between piston areas of the spool which are tightly guided in boring 31 of the sleeve 32.

Pistons and the axial grooves 29 and 30 cooperate with three transverse borings 33, 34 and 35 formed in valve sleeve 32 to connect boring 31 with corresponding annular grooves 39, 40 and 41 formed in plate 13. The annular grooves are concentrically arranged about boring 38 in the valve plate 13 in which the valve sleeve 32 is seated. A fluid return channel 42 connects the annular groove 40 to a pressure space 43 formed at the end of boring 38 and communicating with the central boring 31 of the valve sleeve 32. The end space 43 is connected to port 44. The annular groove 35 is connected via an inclined boring 46 in the tubular core 24 to the intermediate space 26 in the core. The annular grooves 39, 40 and 41 communicate respectively with ports 47, 48 and 49 in the outer wall of the valve plate 13.

When the control valve of this invention is employed for the shift control of an automatic transmission of a motor vehicle, the port 47 is connected to the main pressure fluid of the shift control system, whereas the ports 44 and 48 lead to conduits supplying a regulated pressure fluid to the coupling members of the transmission. Port 49 opens in a pressure free space.

The operation of the electromagnetically controlled guide spool valve of this invention is relatively simple. According to the energization of the electromagnet 11, the plunger 21 moves axially to the right or to the left. In the left end position of the plunger borings 34 and 33 are interconnected by the axial grooves 29 and 30 so that the main pressure is applied to the coupling of the transmission. At the same time, this main pressure is admitted via the return flow channel 42 also against the left face of the plunger 21 communicating with the end space 44. As a consequence the shifting pressure is quickly adjusted to its correct volume. If the sliding spool 21' is moved to its right-hand end position, the coupling is connected via port 48, the transverse boring 34, the groove 30, and transverse boring 35 to the port 49 leading to a pressure free space so that the coupling becomes unloaded.

The pressure spring 27 assist the control moment of the sliding spool even when small pressures are applied. For the operation of the valve it is important that after the response of the valve the pressure be relieved as soon as possible. A fast pressure relief in the valve of this invention is enabled by relatively large cross-sections of the flow passages defined by the annular grooves 39 through 41. It is also of advantage when the return flow channel 42 is an integral part of the valve plate 13.

It will be understood that each of the elements described above, or two or more together, may also find a useful application in other types of constructions differing from the type described above.

While the invention has been illustrated and described as embodied in a specific example of the electromagnetically operated slide spool valve, it is not intended to be limited to the details shown, since various modifications and structural changes may be made without departing in any way from the spirit of the present invention.

What is claimed as new and desired to be protected by Letters Patent is set forth in the appended claims:

1. In an electromagnetically operating sliding spool control valve particularly for controlling the shift of a transmission system of a motor vehicle by directing a pressure fluid to a load port and alternatively to a return fluid port, a combination comprising an electromagnet having a tubular-shaped coil, a fixed magnetizable core arranged in said coil and defining a central passage, a valve sleeve connected to one end of said core, a plunger projecting through said tubular core into said sleeve, and an armature facing the other end of said core and coaxially surrounding said plunger in connected relationship for joint movement with the plunger, the end portion of said plunger defining grooves and piston areas forming said valve spool, and a return spring disposed between said core and said armature.

2. The combination as defined in claim 1, further including a valve channel plate having a central boring and a plurality of fluid ports communicating with the central boring, said valve sleeve being seated in said central boring and defining a plurality of transverse passages connecting the central passage of said sleeve with respective ports.

3. The combination as defined in claim 2, wherein said sliding spool defines on its surface at least one axial groove which cooperates with the openings of consecutive transverse passages in the valve sleeve and thus controls the fluid flow in said ports.

4. The combination as defined in claim 3, wherein said ports include annular recesses formed in said central boring of said valve plate and communicating respectively with the outlets of said transverse borings in the sleeve.

5. The combination as defined in claim 4, further including a housing covering said coil and supporting a bearing for guiding said plunger.

6. The combination as defined in claim 5, wherein said central passage of said core is larger in diameter than said plunger and said pressure spring is a spiral spring surrounding a plunger portion in the central passage of said core.

7. The combination as defined in claim 6, wherein said core faces said armature approximately midway in the tubular space in said magnetic coil.

* * * * *